(12) United States Patent
Rajagopal (10) Patent No.: US 11,159,982 B2
(45) Date of Patent: Oct. 26, 2021

(54) SYSTEM AND METHOD FOR REDUCTION IN FRONTHAUL INTERFACE BANDWIDTH FOR CLOUD RAN

(71) Applicant: MAVENIR NETWORKS, INC., Richardson, TX (US)

(72) Inventor: Sridhar Rajagopal, Plano, TX (US)

(73) Assignee: Mavenir Networks, Inc., Richardson, TX (US)

( * ) Notice: Subject to any disclaimer, the term of this patent is extended or adjusted under 35 U.S.C. 154(b) by 12 days.

(21) Appl. No.: 16/357,506

(22) Filed: Mar. 19, 2019

(65) Prior Publication Data

US 2019/0289497 A1  Sep. 19, 2019

Related U.S. Application Data

(60) Provisional application No. 62/645,018, filed on Mar. 19, 2018, provisional application No. 62/646,724, filed on Mar. 22, 2018.

(51) Int. Cl.

| H04W 92/12 | (2009.01) |
| H04W 28/06 | (2009.01) |
| H04B 7/0456 | (2017.01) |
| H04B 7/06 | (2006.01) |
| H04L 25/02 | (2006.01) |
| H04W 88/08 | (2009.01) |
| H04W 88/12 | (2009.01) |

(52) U.S. Cl.
CPC .......... *H04W 28/06* (2013.01); *H04B 7/0465* (2013.01); *H04B 7/0617* (2013.01); *H04L 25/0256* (2013.01); *H04L 25/0258* (2013.01); *H04W 88/085* (2013.01); *H04W 88/12* (2013.01); *H04W 92/12* (2013.01)

(58) Field of Classification Search
CPC ............... H04B 7/0456; H04B 7/0465; H04B 7/0617; H04L 25/0204; H04L 25/0224; H04L 25/0256; H04L 25/0258; H04W 28/06; H04W 88/085; H04W 88/12; H04W 92/12

See application file for complete search history.

(56) References Cited

U.S. PATENT DOCUMENTS

| 2015/0124688 | A1* | 5/2015 | Xu ..................... H04L 27/2607 370/312 |
| 2016/0242147 | A1 | 8/2016 | Tarlazzi et al. |
| 2017/0063491 | A1 | 3/2017 | Bruckman et al. |
| 2017/0237831 | A1* | 8/2017 | Yang ........................ H04B 1/66 370/230 |
| 2017/0238361 | A1 | 8/2017 | Pawar et al. |
| 2017/0251493 | A1 | 8/2017 | Zhang |
| 2017/0373890 | A1 | 12/2017 | Fertonani et al. |

OTHER PUBLICATIONS

"Common Public Radio Interface: eCPRI Interface Specification" eCPRI Specification V1.1 (Jan. 10, 2018).

(Continued)

*Primary Examiner* — Asad M Nawaz
*Assistant Examiner* — Zhaohui Yang
(74) *Attorney, Agent, or Firm* — Ohlandt, Greeley, Ruggiero & Perle, LLP (57) ABSTRACT

There are provided systems, methods, and interfaces for optimization of the fronthaul interface bandwidth for Radio Access Networks and Cloud Radio Access Networks.

3 Claims, 8 Drawing Sheets

(56) References Cited

OTHER PUBLICATIONS

"LTE; Evolved Universal Terrestrial Radio Svrdd (E-UTRA); Physical Layer Procedures" (3GPP TS 36.213 version 13.0.0 Release 13) ETSI TS 136 213 V13.0.0 (May 2016).
3rd Generation Partnership Project; Technical Specification Group Radio Access Network; Study on new radio access architecture and interfaces (Release 14) 3GPP TR 38.801 V14.0.0 (Mar. 2017).
Girnyk et al"On the Asymptomatic Sum Rate of Downlink Cellular Systems with Random User Locations", IEEE Wireless Communication Letters, IEEE, Jun. 2015.
"O-RAN Fronthaul Working Group Control, User and Synchronization Plane Specification", ORAN-WG4.CUS.0-v01.00 O-RAN Alliance, 2019.
"O-RAN Alliance Working Group 4 Management Plane Specification" O-RAN-WG4.MP.0-v01.00, O-RAN Alliance, 2019.
"XRAN Fronthaul Working Group, Control, User and Synchronization Plane Specification", XRAN-FH.CUS.0-v02.01, xRAN, 2018.
International Search Report and Written Opinion for corresponding international application PCT/19/22851, 14 pages dated Jun. 6, 2019.

* cited by examiner

| 7 | 6 | 5 | 4 | 3 | 2 | 1 | 0 | Number of Octets | |
|---|---|---|---|---|---|---|---|---|---|
| eCPRI common header and common fields in the application layer header ||||||||  13 | Octets 1 - 13 |
| sectionType (to indicate TM2-4 layer based operation) |||||||| 1 | Octet 14 |
| sectionId (for UE1) |||||||| 2 | Octet 15 |
| (PRBs used, etc.) [Same as that of Type 1] |||||||| | |
| sectionId (for UE2) |||||||| 2 | Octet... |

SYSTEM AND METHOD FOR REDUCTION IN FRONTHAUL INTERFACE BANDWIDTH FOR CLOUD RAN

CROSS REFERENCE TO RELATED APPLICATIONS

The present application claims priority to U.S. Provisional Patent Application No. U.S. Provisional Patent Application No. 62/645,018, filed on Mar. 19, 2018, and to U.S. Provisional Patent Application No. 62/646,724, filed on Mar. 22, 2018, the entirety of each of which is incorporated by reference herein.

BACKGROUND OF THE DISCLOSURE

Field of the Disclosure

The present disclosure relates to systems and methods for radio access networks, including 4G and 5G based mobile networks.

Description of the Related Art

Conventional radio access networks (RAN) were built employing an integrated unit where the entire RAN was processed. The RAN network traditionally uses application specific hardware for processing, making them difficult to upgrade and evolve. As future networks evolve to have massive densification of networks to support increased capacity requirements, there is a growing need to reduce the capital and operating costs of RAN deployment and make the solution scalable and easy to upgrade.

Cloud based Radio Access Networks (CRAN) are networks where a significant portion of the RAN layer processing is performed at a central unit (CU), also known as the baseband unit (BBU), located in the cloud on commercial off the shelf servers while the RF and real-time critical functions can be processed in the remote radio unit (RU or RRU) and a distributed unit (DU). Sometimes, the DU is also considered to be part of the CU/BBU depending on the functional split.

In order for the RU and DU/CU to communicate, there is an interface needed that is called the fronthaul. However, there are various challenges that go into the interface design, as splitting of the RAN functions into the CU and DU impact the transport latency and bandwidth requirements. Also, there are many different features in RAN that need to be supported. The choice of the split and the communication interface aspects need to be carefully designed.

Traditional RANs implement the protocol stack (e.g., Physical Layer (PHY), Medium Access Control (MAC), Radio Link Control (RLC), Packet Data Convergence Control (PDCP layers)) at a base station (BS, also referred to as the eNodeB or eNB). In Cloud RAN, different radio functions are split between the remote radio unit (RU) and the baseband unit (BBU). RUs are implemented locally onsite, while the BBU is virtualized on the cloud, which could be hundreds of miles away from the RU. A single BBU (or vRAN–virtualized RAN, which is a specific form of CRAN running on a COTS hardware platform in a VM or container) can control multiples of RUs in different locations.

In traditional LTE networks, all the LTE functionalities and the layers of the LTE protocol stack reside in the eNB small cell, which is deployed on site. There are multiple benefits of the CRAN solution (i.e., splitting the BBU and the RRU) compared to traditional LTE networks.

Cloud RAN provides centralization and virtualization of RAN networks, leading to benefits such as (a) operation cost reduction due to resource pooling and running the network on general-purpose hardware, enabling economies of scale, (b) performance improvements due to better interference management, (c) remote upgradeability and management of the network, and (d) simpler migration to add new features and transition from 4G to 5G networks.

CRAN provides flexibility to the Mobile network operators (MNO) to be able to optimize system performance in real-time by varying various configuration and system parameters using the cloud-based infrastructure.

As new wireless technologies and standards appear, MNOs are required to upgrade their eNB small cells which is usually accompanied by high costs. Using CRAN, most of the LTE functionalities in the BBU will be software-based, which can be easily upgraded when new wireless technologies appear. This can reduce upgrading costs significantly.

Having a software-based BBU in the cloud has other benefits such as the flexibility in adding new services and the significant reduction in the operation and management (OAM) costs.

SUMMARY OF THE DISCLOSURE

The present disclosure provides embodiments of a system and a method for a physical layer functional split between the CU and the RUs that maximizes the efficiency of the transport and allows the flexibility to support many of the features required for virtualization and commercialization of cloud RAN technology.

The interface between virtualized baseband units (vBBUs) deployed in the cloud and remote radio units (RU) or remote radio heads (RRH) deployed on sites are BBUs that are referred to as central units (CU). RUs are also referred to as distributed units (DU).

Both the BBU and RU can act as eNB or small cell access point that provides wireless connectivity to UEs in licensed (4G and 5G bands), unlicensed (e.g., 5 GHz UNII band), and shared spectrum (e.g., CBRS band).

Accordingly, embodiments also cover macro cells and 5G systems.

Embodiments of systems and methods to which the present disclosure is directed include the following.

In an embodiment, described is a system and a method to make the fronthaul interface split dependent on the number of layers for all transmission modes in LTE/LTE-A and 5G and independent of the number of antenna ports, where the number of layers is less than or equal to the number of antenna ports.

In another embodiment, described is a system and a method for supporting a layer-based fronthaul interface between BBU and RRU for transmission modes TM1, TM2, TM3 and TM4 using a section type separation.

In still another embodiment, described is a system and a method to support layers for different user equipment devices (UEs) in TM3 operation (open loop transmission) by using separate section IDs in a separate section type for TM3 operation.

In another embodiment, described is a system and a method to support layers for different UEs in TM3 operation (open loop transmission) by sending a different precoder index or beamforming weights for every resource element (RE).

In yet another embodiment, described is a system and a method to support flexible (sounding reference signal) SRS transmission by indicating the antennas over which SRS will be transmitted over the fronthaul interface.

In still another embodiment, described is an antenna ID field in an SRS section message to indicate the antenna numbers for which SRS is to be transmitted over the interface.

In yet another embodiment, described is a system and a method to encode the antenna numbers using 1's and 0's in the antenna field to indicate the antennas for which an PRACH or SRS message needs to be transmitted.

In a further embodiment, described is a system and a method to support flexible physical random access channel (PRACH) transmission by indicating the antennas over which the PRACH will be transmitted over the interface.

In another embodiment, described is an antenna ID field in a PRACH section message to indicate the antenna numbers for which the SRS is to be transmitted over the interface is disclosed.

In an embodiment of this disclosure, a system and a method to provide layer-based interface for all transmission modes are disclosed. In order to support layer based interface for transmission modes TM1, TM2, TM3 and TM4, the precoding function can be to be moved in the RU. Precoding matrices are defined in 3GPP standard and described in the xRAN and O-RAN standards XRAN-FH.CUS.0-v02.01.03 (2018 Oct. 30), ORAN-WG4.CUS.0-v01.00 (2019 Mar. 11), and ORAN-WG4.MP.0-v01.00 (2019 Mar. 11), the entirety of each of which is incorporated by reference herein.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified. For a better understanding, reference will be made to the following Detailed Description, which is to be read in association with the accompanying drawings.

DETAILED DESCRIPTION OF THE EMBODIMENTS

Reference is made to Third Generation Partnership Project (3GPP) system, the O-RAN Fronthaul Working Group, and the xRAN Fronthaul Working Group in accordance with embodiments of the present disclosure. The present application employs abbreviations, terms and technology defined in accord with Third Generation Partnership Project (3GPP) technology standards, O-RAN Fronthaul Working Group technology standards, and xRAN Fronthaul Working Group technology standards, including the following standards and definitions. The 3GPP, O-RAN Fronthaul Working Group, and xRAN Fronthaul Working Group technical specifications (TS) and technical reports (TR) referenced herein are incorporated by reference in their entirety herein and define the related terms and architecture reference models that follow.

Abbreviations
3GPP: Third generation partnership project
BBU: Baseband unit
BS: Base Station
CBRS: Citizens Broadband Radio Services
CP: cyclic prefix
CRAN: cloud radio access network
CPRI: Common Public Radio Interface
CWDM: Coarse wavelength-division multiplexing
CU: Central unit
DL: downlink
DU: Distribution unit
EPC: Evolved Packet Core
eNB: Evolved Node B
FFT: Fast Fourier Transform
iFFT: inverse Fast Fourier Transform
LAA: licensed-assisted access
LTE: long term evolution
LTE-A: LTE Advanced
MAC: Media Access Control
MIMO: Multiple input, multiple output
MNO: Mobile network operator
OFDM: Orthogonal Frequency Division Multiplexing
PDCP: Packet Data Convergence Protocol
PHY: physical layer
PRB: Packet receive buffer
PRI: Pre-coding matrix indicator
LPHY: lower physical layer
UPHY: upper physical layer
RACH: random access channel
PRACH: physical random access channel
RE: Resource element
RF: radio frequency interface
RLC: Radio Link Control
RRC: Radio Resource Control
RRU: Remote radio unit
SRS: Sounding reference signal
TDD: Time division duplex
TM: Transmission Mode
UE: user equipment
UL: uplink
UNII radio band: Unlicensed National Information Infrastructure radio band
vBBU: Virtualized baseband unit Reference is also made to CPRI, the Industry Initiative for a Common Public Radio Interface, in accordance with embodiments of the present disclosure. The present application employs abbreviations, terms and technology defined in eCPRI technology standard and consistent with 3GPP technology standards. The CPRI technical specification eCPRI specification V1.1 (2018 Jan. 10), incorporated by reference in its entirety herein.

The present disclosure provides embodiments of systems, devices and methods for LTE operation for Cloud RANs.

Figure 1:
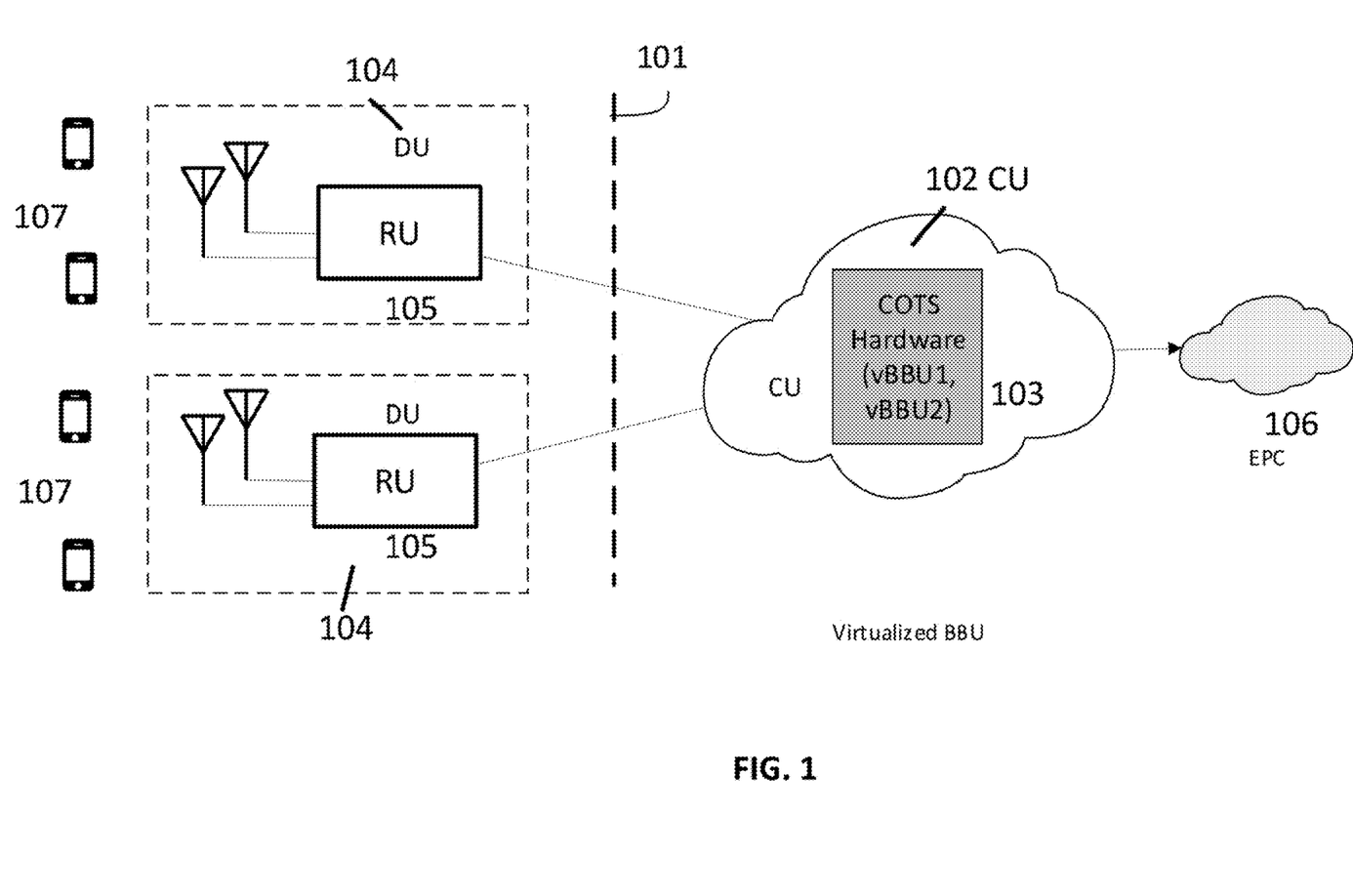
FIG. 1 illustrates an example of a CRAN system architecture and a functional fronthaul split.

FIG. 1 is an example of a CRAN system architecture 100 and a functional fronthaul split 101 for a BS including cloud RAN 100 with a Central Unit ("CU") 102 including BBU or BBU pools 103 and one or more Distributed Units ("DU") 104 including an RU. The BBU pools 103 can be connected to other BBU pools and connected to the evolved packet core (EPC) network 106 via an S1 interface. The RRUs 105 connect User Equipment (UE) 107 to the network.

In order for the RRU 105 to operate and access the unlicensed/shared spectrum, various embodiments of modules can be incorporated in the CRAN and configured for functions such as carrier-selection, Listen-Before-Talk (LBT), dynamic frequency selection (DFS), reference signals transmission (e.g., Discovery reference signal or DRS), and the like.

In conventional LTE networks, the LTE functionalities and the layers of the LTE protocol stack reside in the eNB small cell, which is deployed on site. There are multiple benefits of the CRAN solution (i.e., splitting the BBU 103 and the RRU) compared to traditional LTE networks.

Cloud RAN provides flexibility to the Mobile network operators ("MNO") to be able to optimize system performance in real-time by varying various configuration and system parameters using the cloud-based infrastructure.

To enable the CRAN solution, the BS LTE functionalities need to be split between the BBU 103 in the cloud and the RU 105 onsite.

Figure 2A:
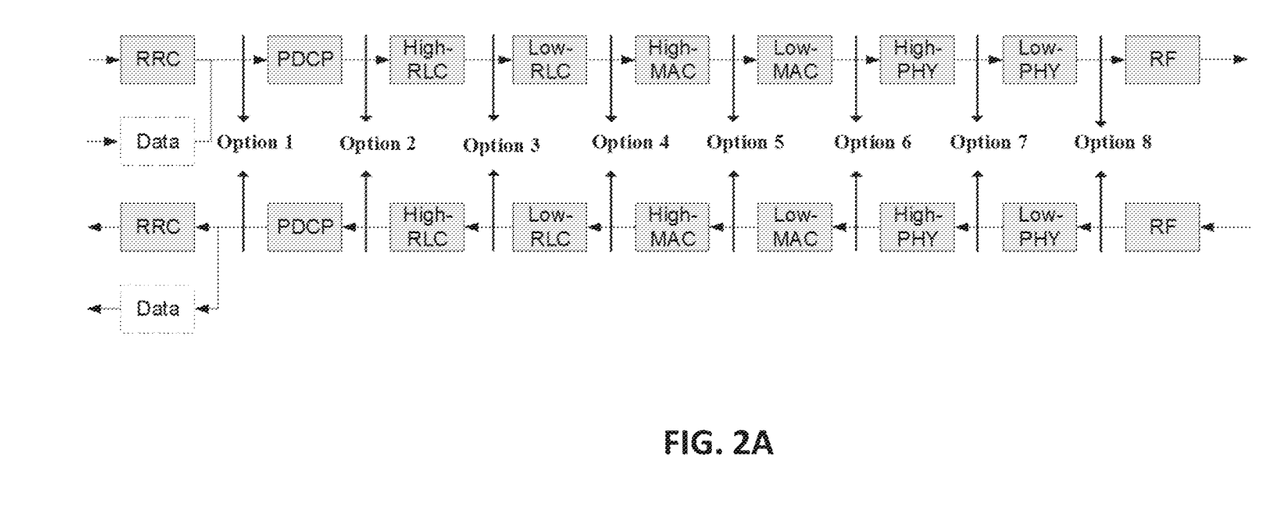
FIGS. 2A-2B illustrate options for the split between a BBU and a RU.

3GPP has defined 8 options in TR 38.801 V14.0.0 (2017 March) for the split between the BBU 103 and the RU 105 as shown in FIG. 2A, where each set of arrows show the split between the layers in the CU on the right and the DU 104 on the left:

Option 1

RRC is in the central unit. PDCP, RLC, MAC, physical layer and RF are in the distributed unit.

Option 2

RRC, PDCP are in the central unit. RLC, MAC, physical layer and RF are in the distributed unit.

Option 3 (Intra RLC Split)

Low RLC (partial function of RLC), MAC, physical layer and RF are in the distributed unit. PDCP and high RLC (the other partial function of RLC) are in the central unit.

Option 4 (RLC-MAC Split)

MAC, physical layer and RF are in the distributed unit. PDCP and RLC are in the central unit.

Option 5 (Intra MAC Split)

RF, physical layer and some part the MAC layer (e.g. HARQ) are in the distributed unit. Upper layer is in the central unit.

Option 6 (MAC-PHY Split)

Physical layer and RF are in the distributed unit. Upper layers are in the central unit.

Option 7 (Intra PHY Split)

Part of physical layer function and RF are in the distributed unit. Upper layers are in the central unit.

Option 8 (PHY-RF Split)

RF functionality is in the distributed unit and upper layer are in the central unit.

There are multiple factors affecting the selection of the fronthaul split option:

Bandwidth: different split options have different bandwidth requirements, which eventually plays a role in determining the fronthaul design. As an example, option 8 (PHY-RF split) has very high requirements on fronthaul bandwidth, which may imply higher resource consumption and costs in transport dimensioning (link capacity, equipment, and the like). On the other hand, one benefit of option 5 (intra MAC split) is that it reduces the bandwidth needed on fronthaul.

Latency: in the LTE protocol stack, the split between the BBU 103 and the RU 105 effects the latency. For example, splitting between L3 and L2 in option 1 has very low latency requirements. This split option is useful in handling some edge computing or low latency use cases where the user data needs to be located close to the transmission point. Another example is split option 3 in the RLC layer. The split in option 3-1 is more latency sensitive than the split with ARQ in DU, since re-transmissions are susceptible to transport network latency over a split transport network. On the other hand, option 3-2 is insensitive to the transmission network latency between CU and DU. In split option 5 (intra MAC), time critical functions are present in the Low-MAC sublayer that include the functions with stringent delay requirements (e.g. HARQ) or the functions where performance is proportional to latency (e.g. radio channel and signal measurements from PHY, random access control). This split helps in reducing the delay requirements on the fronthaul interface. On the other hand, option 8 has very high requirements on fronthaul latency, which may cause constraints on network deployments with respect to network topology and available transport options.

Implementation Cost: Higher splits usually have high implementation costs compared to lower splits since lower splits allow for more virtualization. As an example, in split option 8, separation of RF and PHY allows pooling of PHY resources, which may enable a more cost-efficient dimensioning of the PHY layer. Separation of RF and PHY allows operators to share RF components, which can reduce system and site costs. On the other hand, high requirements on fronthaul bandwidth implies higher resource consumption and costs in transport dimensioning (link capacity, equipment, and the like).

Other factors include virtualization benefits, complexity of the fronthaul interface, expansion flexibility, computing power, and memory requirement.

The current disclosure presents embodiments related to split option 7 interface (i.e., intra PHY split) and optimizing it to support different transmission modes (TM).

Layer based and bit-oriented interfaces greatly benefit large antenna-based deployments. Such enhancements can reduce fronthaul requirements by 2×-4× and beyond for antenna port-based interfaces.

Further, transport to enterprise deployments are bandwidth constrained as provisioning bandwidth is based on averages. Statistical multiplexing enables support for peak rates to a single RU radio. Enterprise deployments can use statistical mixing to balance UL streams to DL rates. For example, each CRAN deployment can consist of 10's of RU radios with low Packet Receive Buffer (PRB) usage. Each radio can use 1 to N UL streams based on deployment specific conditions (e.g.: bandwidth (BW), PRB usage and the like).

Multi-radio macro sites can efficiently use and grow BW on existing fiber. Use of existing fiber can be extended. A single strand of fiber with coarse wavelength-division multiplexing (CWDM) can support present BW needs. However, upgrade to 8T or addition of 3 sectors of Full Dimension multiple input, multiple output (FD-MIMO) can push BW to capacity. As such, expansion of technologies such as LAA and higher DL RB usage, can benefit from embodiments as described herein.

Low rank transmissions (with low number of layers) are very common in multiple antenna system deployments due to channel and UE constraints. For example, rank 1 usage can be more than 50% in macro deployments, which makes the fronthaul interface very inefficient if the bandwidth is dependent on the number of antenna ports. Also, uplink streams can be combined/down-selected at the RU.

There are multiple embodiments for which the PHY can be split for Option 7. These include asymmetrical configurations that obtain benefits for different sub-options for UL and DL independently (e.g. Option 7-1 is used in the UL and Option 7-2 is used in the DL). These include:

Option 7-1: In the UL, FFT, CP removal and RACH filtering functions can reside in the DU, whereas the rest of PHY functions can reside in the CU. In the DL, iFFT and CP addition functions reside in the DU, and the rest of PHY functions reside in the CU. This option allows the implementation of advanced receivers.

Option 7-2: In the UL, FFT, CP removal, resource de-mapping and pre-filtering functions can reside in the DU, whereas the rest of PHY functions reside in the CU. In the DL, iFFT, CP addition, resource mapping and precoding functions reside in the DU, and the rest of PHY functions reside in the CU.

It is a requirement that both Options 7-1 and 7-2 allow the optimal use of advanced receivers.

Option 7-3 (only for DL): Only the encoder resides in the CU, and the rest of PHY functions reside in the DU. This option can reduce the fronthaul requirements for throughput to the baseband bitrates as the payload for Option 7-3 is encoded data.

Each of the options have a different impact on amount of virtualization and on the transport interface requirements for latency and throughput.

In particular, as systems expand towards larger number of antennas in the base-station, the number of data streams (layers) transmitted to and from the mobile device (UE) still remain fairly small. This is for multiple reasons. For example, it is difficult for the channel to support multiple layer transmissions without accurate channel state information. Hence, under interference, low SNR and mobility conditions, a limited number of layers are transmitted, even though the base-station can support more layers. Also, many of the mobile devices operating in the network can be low in cost and complexity, and may not support more than 1 or 2 layers, especially on uplink.

Figure 2B:
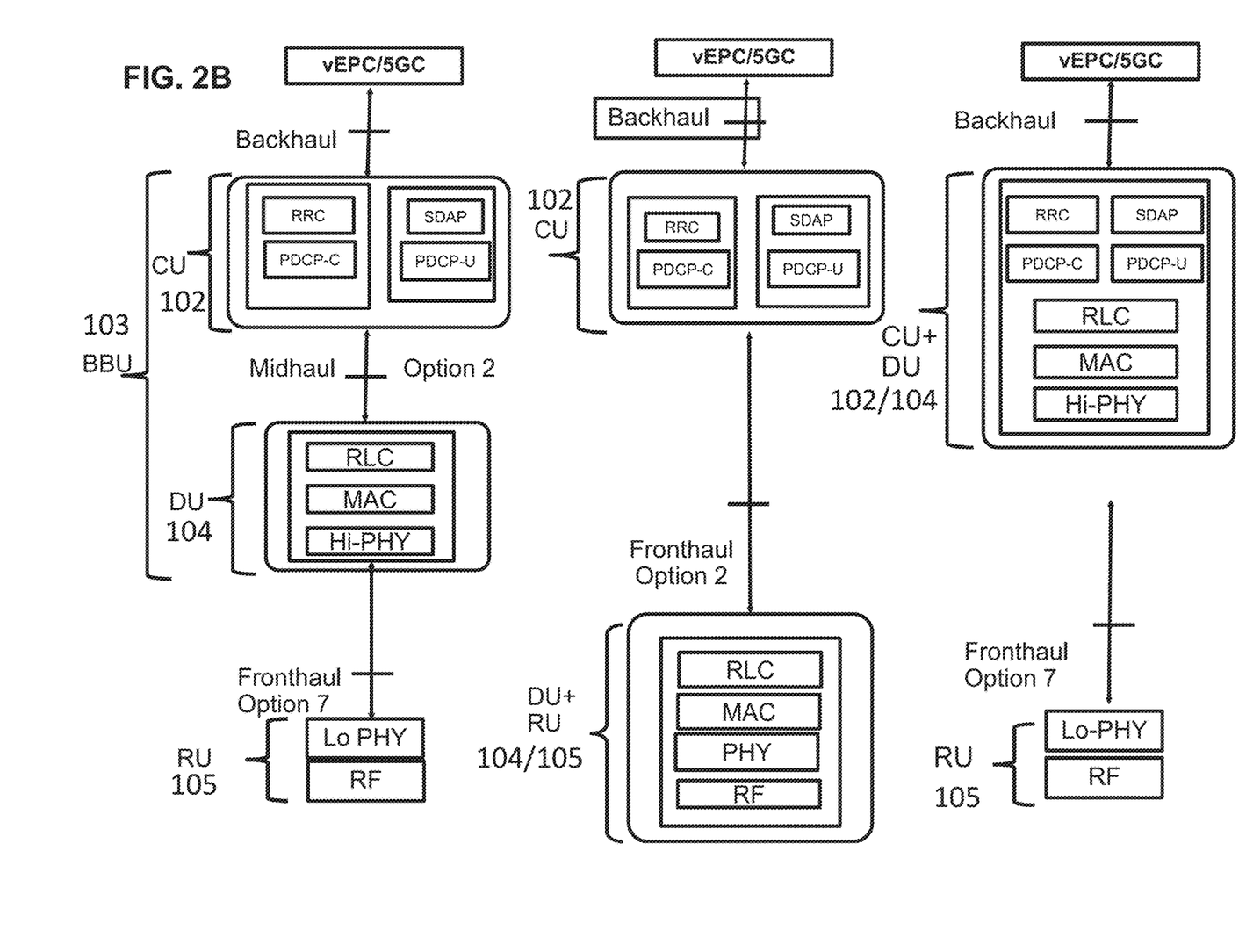

FIG. 2B illustrates a number of configurations for split option 7 and split option 2. In a first configuration, the BBU comprises the CU and the DU, with a midhaul split between the CU and the DU. The fronthaul split between is between the RU and the DU at the BBU, with the physical layer divided between the Lo PHY at the RU and the Hi PHY at the DU.

In another exemplary configuration, RU includes the DU, and the fronthaul split is between the CU and the RU. In this configuration, the entire physical layer PHY is at the DU/RU.

In another exemplary configuration, the CU comprises the DU with the fronthaul split between the CU and the RU. The Lo PHY is at the RU and the Hi-PHY is at the DU.

Figure 3:
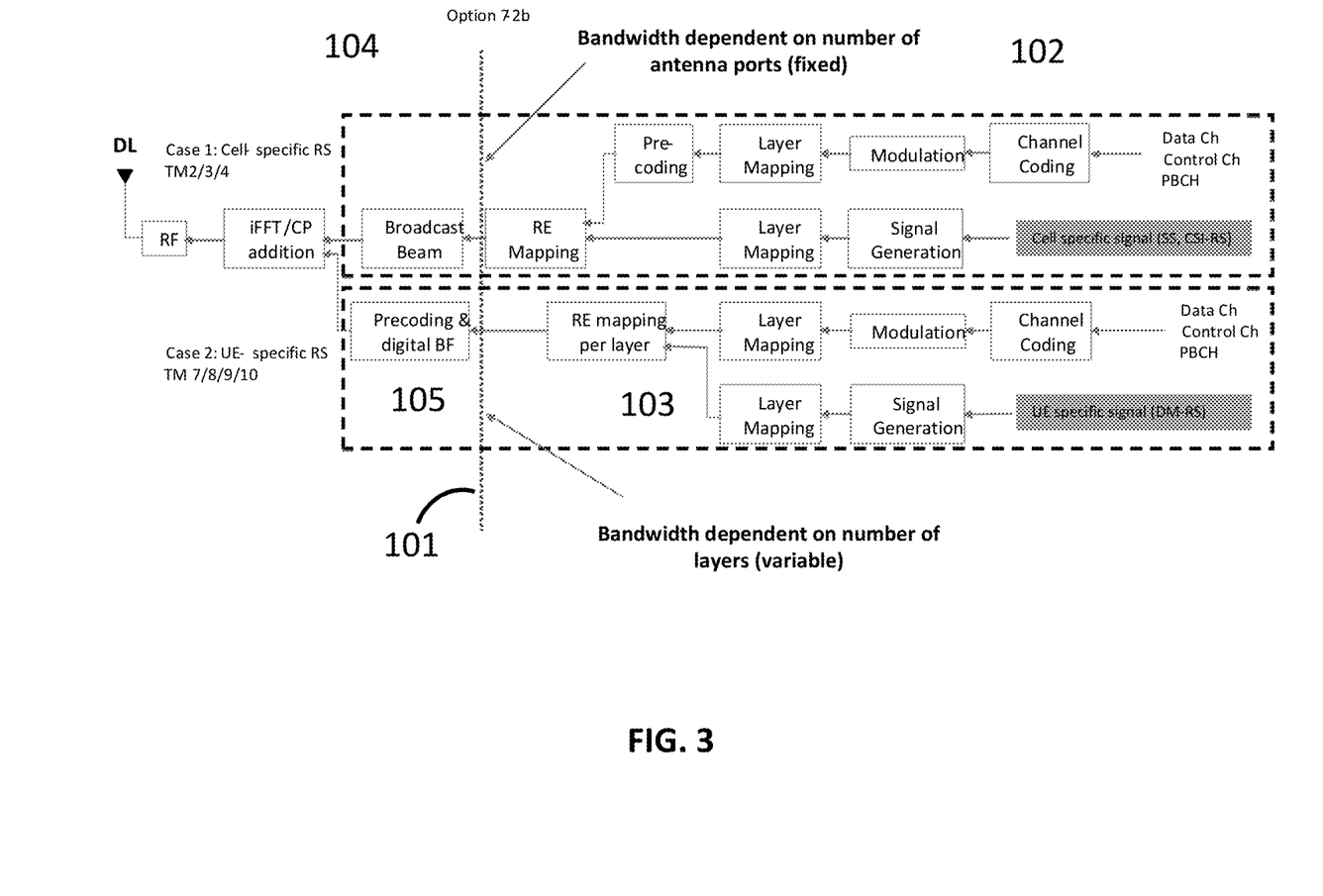
FIG. 3 illustrates various embodiments of an intra-PHY split option.

FIG. 3 illustrates an embodiment of an intra-PHY split option 7. FIG. 3 shows a functional split option 7-2b for the LTE downlink at the base-station for a CRAN system. In this split option, the fronthaul interface bandwidth depends on the transmission mode and antenna ports. The fronthaul interface bandwidth is dependent on the number of antenna ports for transmission modes (TM) TM2, TM3 and TM4 independent of the number of layers. Transmission modes are described in 3GPP TS 213 ETSI TS 136 213 V13.0.0 (2016 May), the entirety of which is incorporated by reference herein. Transmission modes (TM) TM2, TM3 and TM4 are used when the reference signals are cell-specific. The fronthaul bandwidth is fixed for these transmission modes on the downlink based on the number of antenna ports. For transmission modes TM7, TM8 and TM10 and for 5G, the fronthaul bandwidth is dependent on the number of layers, independent of the number of antenna ports. The fronthaul bandwidth is variable for these transmission modes based on the number of layers transmitted to the UE. By extending this to TM2-4, the entire solution can be made dependent on the number of layers and provide improved compression on the fronthaul.

Figure 4:
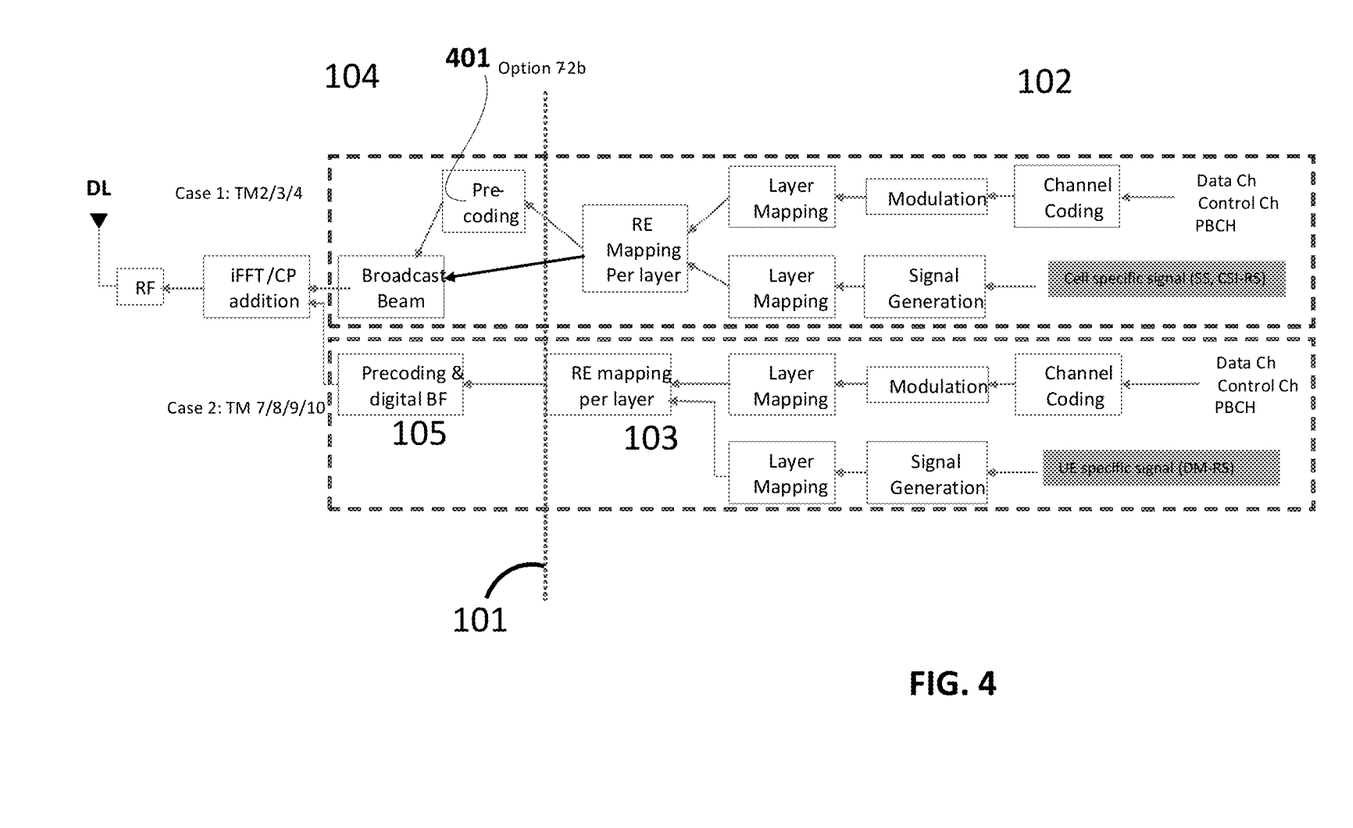
FIG. 4 illustrates an embodiment of a functional interface split.

FIG. 4 shows the functional interface split where a precoding function 401 is moved to the RU for transmission modes that use cell-specific reference signals (TM2, TM3, and TM4). Reconfiguring the RU 105 to perform precoding makes the beamforming/precoding functions part of the RU 105 so that the interface is dependent on the number of layers, and not the number of antennas. For TM3 and TM4 transmission modes, the only information that needs to be transmitted is an index of the precoding matrix and the number of layers used. The index in TM3 can be a function of the resource elements (RE) instead of a physical resource block (PRB), which is typically used for other modes such as TM4.

In another embodiment, described is a system and a method to support a layer-based fronthaul interface between BBU 103 and RU 105 for common reference signal based modes (e.g.: TM1, TM2, TM3 and TM4) modes using a section type separation to distinguish common reference signal based modes with UE specific reference signal based modes (e.g.: TM1, TM7, TM8, TM9 and TM10). The RU 105 is configured to understand that the interpretation of the beamforming index needs to be different in different transmission modes; i.e. if a beamforming index is transmitted in TM7-10, it uses one of a plurality of beam weights that pre-computed and stored in the RU 105. If beamforming index is transmitted in TM1, TM2, TM3 and TM4, the RU 105 is configured to re-interpret the beamforming index as a precoder index, and can follow 3GPP defined precoding calculations as described in 3GPPTS 213 ETSI TS 136 213 V13.0.0 (2016 May). Thus, the transmission mode used per UE are communicated in this case.

Figure 5:
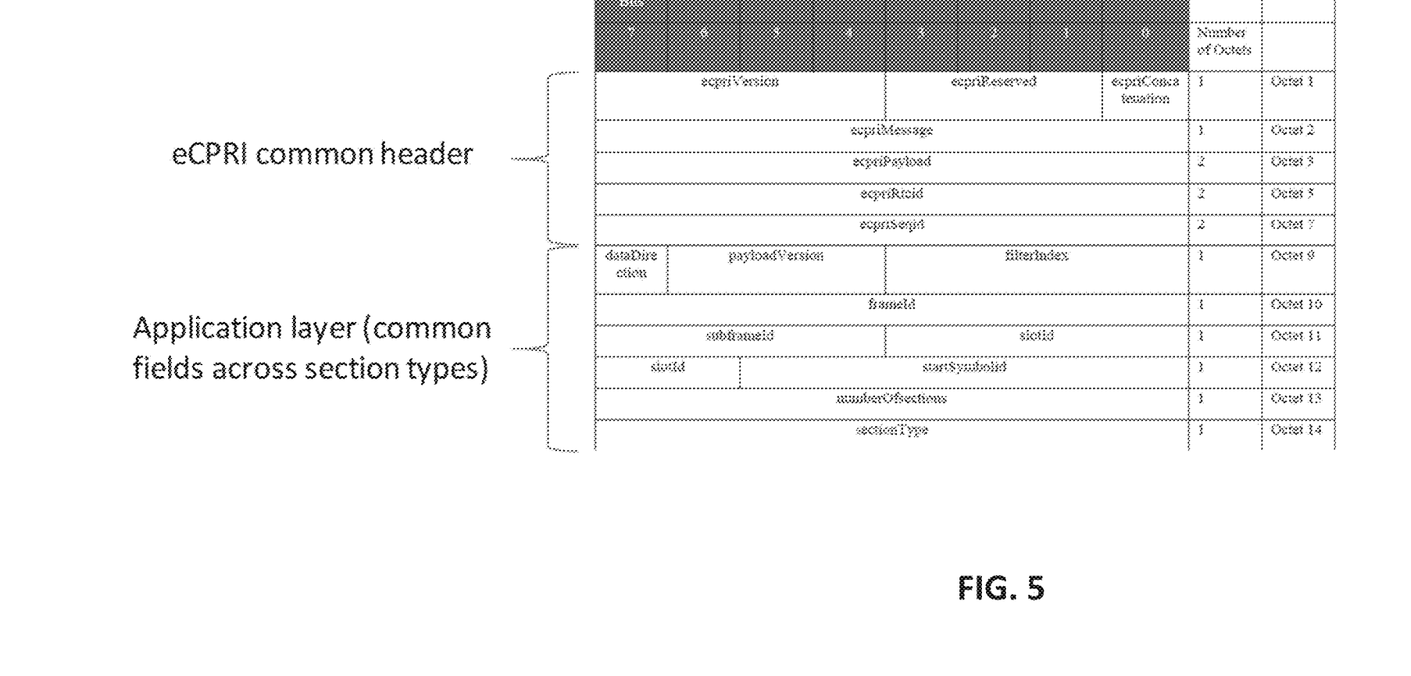
FIG. 5 illustrates an embodiment of a message type based on an Common Public Radio Interface (eCPRI) interface.

An example message type based on eCPRI interface is shown in FIG. 5. It contains an eCPRI common header as well as an application layer field that can be common among section types. In one embodiment, an eCPRI interface is a packet based fronthaul interface, for example as described in the eCPRI Specification V1.1 (2018 Jan. 10) (the eCPRI Specification) developed by CPRI forum, the entirety of which is incorporated by reference herein.

Figure 6:
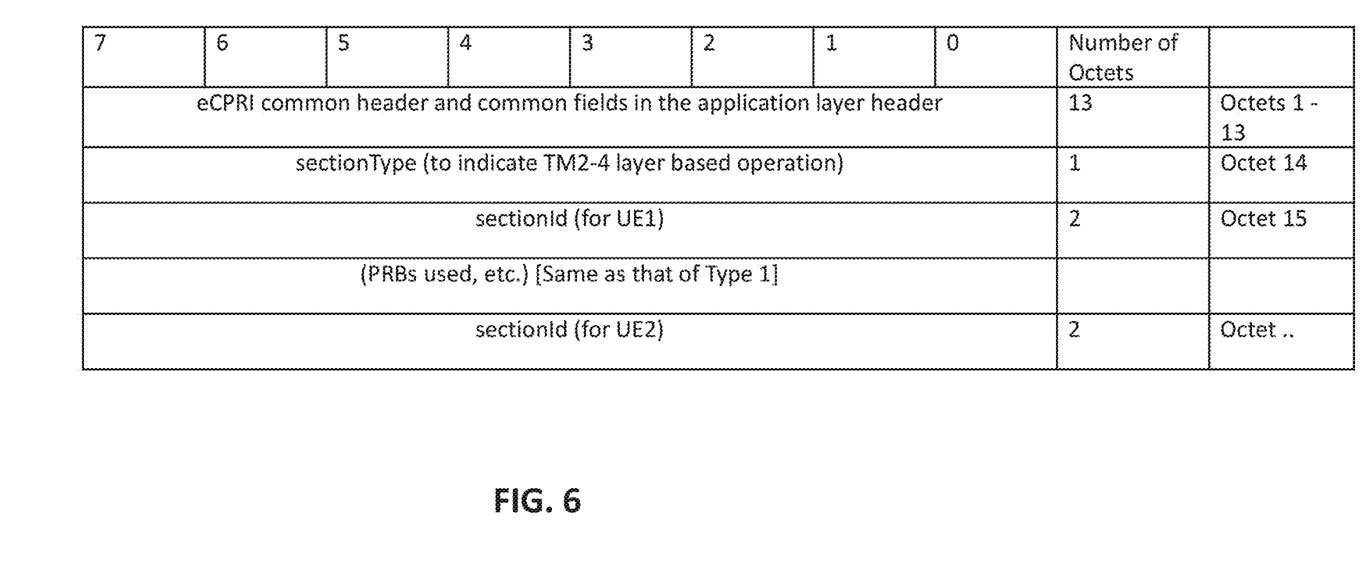
FIG. 6 illustrates a table including a section type and section ID for a layer based interface in a message based on a eCPRI specification.

In an embodiment, a new section type (sectionType) is used to indicate a layer based fronthaul transmission using TM2, TM3 and TM4. Thus, the RU 105 can be configured to handle the precoding/beamforming index as described above differently than other transmission modes. All UEs scheduled in this mode use this sectionType. FIG. 6 is an example of a table for indicating a sectionType and a section ID (sectionID) for a layer-based interface in a message based on the eCPRI Specification.

Described below are embodiments of methods for resetting the precoding/beamforming index per UE.

In an embodiment, precoding weights are computed per resource element (RE) for TM3 and per resource block (RB) for TM4 and sent as beamforming real-time weights.

In another embodiment for resetting the index per UE, a new sectionType field for layer-based precoding for TM1-4 is employed for the eCPRI message. In the eCPRI message, different section IDs (sectionID) are used for each UE. For TM3, no control information or beam ID is required since a precoder index is reset for each sectionID. A default beam ID or default precoder ID can be applied, or the field can be ignored. For TM4, a beamID is re-used in control plane as precoder index ID based on a pre-coding matrix indicator (PMI). In TM3, the control information related to beamforming need not be transmitted (open loop). In such a case for TM3, a default beam ID can be used or the beamID field can be ignored. In TM4, the control information for the beamforming is transmitted, and the beamID is re-interpreted as a precoder index ID.

In another embodiment, a new section type for the eCPRI message is employed for layer-based precoding for TM1-4. For TM3, precoder index is sent and auto-incremented internally per resource block (RB) and then reset per UE. For TM4, a beam ID is re-used in a control plane as precoder index ID (based on PMI). In an embodiment, the index used for precoder matrix in TM3 can be auto-incremented internally for all resource elements (RE) and only index (i) is transmitted over the control interface. Thus, the index (i), (i+12), . . . is incremented until all PRBs allocated to UE are completed. When the index changes per UE, the index can be reset i.e. the index (i) can be reset to 0.

In another embodiment, described is a system and a method to support layers for different UEs in TM3 operation (open loop transmission) using separate sectionIDs in a separate section type for TM3 operation are disclosed. In such a configuration, there is no control channel required to be transmitted to indicate the beamID (as in TM4), and the beamID field can be filled with a default value and/or can be ignored.

In another embodiment of the disclosure, a separate sectionID is created for each UE, which effectively resets the precoder index for the new UE. In this case, there is no precoder index that needs to be communicated for TM3 (open loop). Accordingly, the precoding index field can be ignored and the control information for beamforming need not be transmitted. For TM4, the precoder index is used based on PMI and is transmitted as the beamID, which is re-interpreted as the precoder index ID.

Table 1 shows an example of a table for indicating a section type and a section ID for a layer based interface in a message based on the eCPRI Specification. The Table is similar to a sectionType=1 formats, except that instead of a beam index, a UE ID is sent. This allows matching UE ID to U-Plane data via the section ID.

TABLE 1

| Section Type 5: UE ID conveyance | | | | | | | | | |
|---|---|---|---|---|---|---|---|---|---|
| 0 (msb) | 1 | 2 | 3 | 4 | 5 | 6 | 7 (lsb) | # of bytes | |
| ecpriVersion | | | | ecpriReserved | | | ecpriConcatenation | 1 | Octet 1 |
| ecpriMessage | | | | | | | | 1 | Octet 2 |
| ecpriPayload | | | | | | | | 2 | Octet 3 |
| ecpriRtcid | | | | | | | | 2 | Octet 5 |
| ecpriSeqid | | | | | | | | 2 | Octet 7 |
| dataDirection | payloadVersion | | | filterIndex | | | | 1 | Octet 9 |
| frameId | | | | | | | | 1 | Octet 10 |
| subframeId | | | | slotId | | | | 1 | Octet 11 |
| slotId | | | startSymbolid | | | | | 1 | Octet 12 |
| numberOfsections | | | | | | | | 1 | Octet 13 |
| sectionType = 5 | | | | | | | | 1 | Octet 14 |
| compHdr | | | | | | | | 1 | Octet 15 |
| reserved | | | | | | | | 1 | Octet 16 |
| sectionId | | | | | | | | 1 | Octet 17 |
| sectionId | | | rb | startPrbc | | | | 1 | Octet 18 |
| startPrbc | | | | | | | | 1 | Octet 19 |
| numPrbc | | | | | | | | 1 | Octet 20 |
| reMask | | | | | | | | 1 | Octet 21 |
| reMask | | | | numSymbol | | | | 1 | Octet 22 |
| ueId | | | | | | | | 2 | Octet 23 |
| . . . | | | | | | | | | |
| sectionId = P | | | | | | | | 1 | Octet N |
| sectionId | | | rb | startPrbc | | | | 1 | N + 1 |
| startPrbc | | | | | | | | 1 | N + 2 |
| numPrbc | | | | | | | | 1 | N + 3 |
| reMask | | | | | | | | 1 | N + 4 |

TABLE 1-continued

| Section Type 5: UE ID conveyance | | | | | | | | # of bytes | |
|---|---|---|---|---|---|---|---|---|---|
| 0 (msb) | 1 | 2 | 3 | 4 | 5 | 6 | 7 (lsb) | | |
| reMask | | | | | | numSymbol | | 1 | N + 5 |
| | | | ueId | | | | | 2 | N + 6 |
| | | | | | | | | | Octet M |

In Table 1, the fields are as follows:

Message type=2 (C-plane msg).

Payload identifies the radio application payload length in bytes.

Rtcid identifies the carrier, antenna, and spatial stream (or layer).

Seqid identifies the sequence number of the C-plane message.

DataDirection: 0=UL, 1=DL.

filterIndex points to channel filter in RU 105, usually 0x1.

frameId points to a specific 10 ms frame.

SubframeId points to a specific 1 ms subframe within a frame.

slotId points to a specific slot within a frame.

numberOfsections is the number of sections in this message.

SectionType msg applies to 1=DL, 2=UL radio channels (only one sectionType per C-Plane message).

compHdr states IQ bit width and compression method for all sections in this message.

Upper 4 bits iqWidth (range 5-20 bits) for channel IQ bits Lower 4 bits: reserved.

SectionID value allows matching of C and U plane msgs.

rb 0=use every PRB, 1=use every other PRB.

StartPrbc first PRB this section applies to.

numPrbc number of PRBs this section applies to.

reMask states population of REs in the PRB.

numSymbol number of symbols this section applies to.

ueId UE ID to associate with channel state info.

In another embodiment, the CRAN is configured to support layers for different UEs in TM3 operation (open loop transmission) by sending a different precoder index or beamforming weights every RE. The precoding weights can be indicated on a per RE basis so that all transmission modes can use the same control channel. This increases the amount of beam indices transmitted on the interface.

In an embodiment, the CRAN is configured for optimized uplink processing. In particular, an antenna ID field is proposed for uplink channels as well as the management plane to provide information related to power savings and/or eliminate bad antennas from the precoding.

To optimize fronthaul bandwidth and tradeoff performance, the CRAN is configured to support over the fronthaul interface:

Configurability for a number of beams used in UL for data channels (precoding weights are known);

Configurability for a number of antennas used for SRS transmission over fronthaul;

Configurability for a number of antennas to be selected for PRACH and transmitted over fronthaul; and Non-beamformed PRACH.

In an embodiment, the configurations can be indicated over the management plane. The antennas to be used can be indicated to the RU 105 via an antenna ID field (antennaID) so that the RU 105 does not pick random sub-sets for transmission over the fronthaul.

In an embodiment, the CRAN fronthaul interface is configured to support flexible SRS transmission by indicating the antennas over which SRS are to be transmitted over the interface. An antenna ID field in the PRACH section message can be configured to indicate the antenna numbers for which the SRS is to be transmitted over the interface.

In an embodiment, the antenna numbers can be encoded using 1's and 0's in the antennaID field to indicate the antennas for which the PRACH or SRS message needs to be transmitted. Accordingly, in another embodiment, the CRAN fronthaul interface is configured to support flexible PRACH transmission by indicating the antennas over which the PRACH is to be transmitted over the interface.

Antenna ID (antennaID) field:

An N-bit binary number (e.g., N={128, 256}) can be used to indicate maximum number of antennas supported by the interface.

Each bit represents an antenna number.

TABLE 2

| A(N-1) | A(N-2) | ... | ... | A(1) | A(0) |
|---|---|---|---|---|---|

In an embodiment, if N>number of antennas supported in the radio (indicated as K), A(N−1) to A(K) should be always set to 0.

Setting a bit to 1 for the radio signal/PRACH control channels means that an SRS or PRACH signal received from that antenna is to be transmitted over the fronthaul interface. In an embodiment, this can be indicated over the management plane.

In another embodiment, the CRAN system is configured to enable and disable certain antennas in the RU 105 radio by setting an antenna ID field. For example, antennas can be enabled and disabled to save power and/or disable antennas that are having calibration or performance issues.

Accordingly, in still another embodiment, the antenna ID field can be used to enable/disable antennas on the RU 105 radio. The antenna ID field can also be configured to turn off/on antennas for data transmissions over the fronthaul interface. This can be done for power saving modes (e.g. low usage of antennas); calibration errors (e.g.: some antennas can cause bad performance and interference if there happens to be a calibration error. Such antennas can be disabled until fixed); and hardware issues on certain antenna elements (e.g. operator may want to use hardware in reduced functionality mode and use limited antennas).

For example, the antenna ID field can be configured to disable antennas to save power on the RU radio, for example, during low activity periods. The antenna ID field can also be used to disable antennas that have calibration or reliability issues. Unreliable or miscalibrated antennas can cause performance loss in the network due to creation of interference. Instead of disabling the entire RU 105 radio, the RU 105 radio can still be operated in a reduced performance mode by turning off certain antennas. The antenna ID field can also be used in the management plane between the RU 105 and the BBU 103 since it is not expected to change every Orthogonal Frequency Division Multiplexing (OFDM) symbol, but changes at a larger timescale. Disabling antennas can also be done dynamically over the control channel as well. By setting these bits on the fronthaul interface to '0', the RU 105 is instructed not to use these antennas until the calibration or reliability issue is resolved or power savings is not critically required.

In an embodiment, there can be a separate antenna ID field for the UL and the DL. This way, one can disable/enable antennas in a certain direction rather than in both directions and provide further control and optimizations.

Thus, 4 antenna ID fields can be supported for the management plane over the fronthaul interface:
1. An SRS antenna field for UL to indicate antennas for which SRS is to be transmitted;
2. A PRACH antenna field for UL to indicate antennas for which PRACH is to be transmitted;
3. A DL antenna field to enable/disable antennas; and
4. A UL antenna field to enable/disable antennas.

Figure 7:
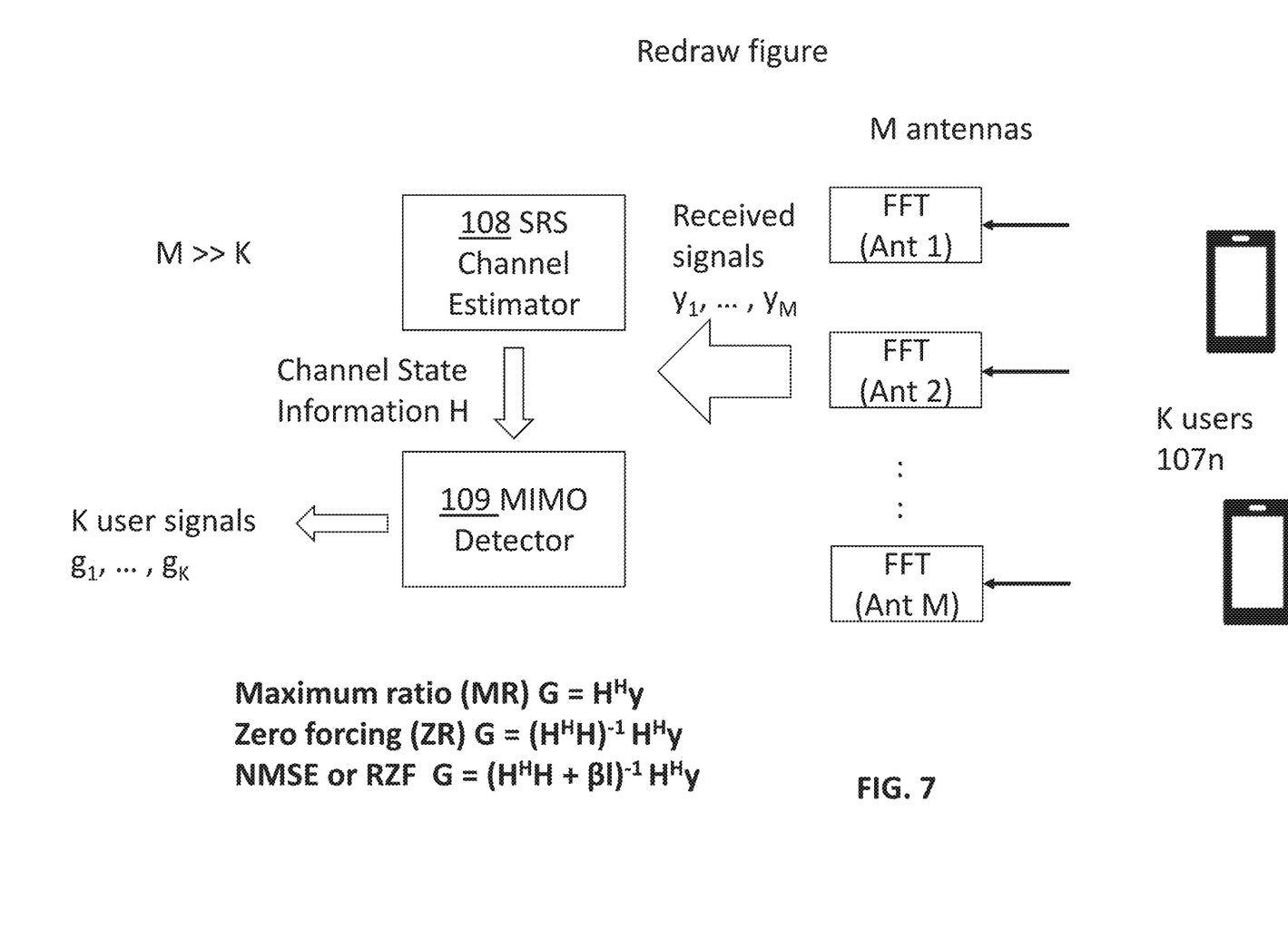
FIG. 7 is an exemplary embodiment for transmitting regularization parameters over a fronthaul interface.

In another embodiment, the CRAN is configured to transmit regularization parameters for a channel estimate-based beamforming over the fronthaul interface. For example, as shown in FIG. 7, the CRAN can be configured to transmit regularization parameters over the fronthaul interface as a set of K positive numbers where K is the number of users 107n. In the embodiment, a MIMO detector 109 can be configured to apply a minimum normalized mean-square error NMSE calculation for channel estimation-based beamforming using a regularization term for the optimization— denoted as β—where β is a diagonal matrix of K users (where each element is greater than 0) and M antennas configured to balance the noise covariance (interference suppression) and the transmit power (desired signal). This is also referred to as regularized zero forcing (RZF). For example, as shown in FIG. 7, over the fronthaul interface, K positive values for K user signals $g_1, \ldots g_K$ can be transmitted for the regularization parameter β for the section type where UE channel information is being reported. K is the number of UEs 107n scheduled in parallel for the matrix inversion operation. These K values can be used for regularization of the matrix inversion. The parameter β can be up to 16 bits (positive numbers) and follow the same format as the channel estimate H. For the example:

Maximum ratio (MR) $G=H^H y$
Zero forcing (ZR) $G=(H^H H)^{-1} H^H y$
And NMSE or RZF $G=(H^H H+\beta I)^{-1} H^H y$ An example of RZF is described in Maksym Girnyk, Axel Müller, Mikko Vehkapera, Lars K. Rasmussen, Meerouane Debbah, *On the Asymptotic Sum Rate of Downlink Cellular Systems With Random User Locations*, IEEE Wireless Communications Letters, IEEE, 2015, <10.1109/LWC.2015.2415796><hal-01235906>. An exemplary advantage includes making sure the matrix is numerically precise and is not ill-conditioned for inversion, since numerical precision is an issue for matrix inversion. If β=0 (null matrix), the system can be configured to default to a zero-forcing (ZF) proposal. For example, take an achievable sum rate versus a signal-to-noise (SNR) downlink cellular system with M=36 antennas at a base station BS and K=12 single antenna Ms in an uncorrelated scenario. The cell radius and the regularization parameter are set to D=2 and ξ=1, respectively. To improve the achievable sum rate in the downlink, the BS applies a precoder $G=[g_1, \ldots, g_K] \in \mathbb{C}^{M \times K}$. Assuming K users who are jointly scheduled for MU-MIMO 109 operation, a beamforming matrix $G=[g_1, \ldots, g_K] \in \mathbb{C}^{M \times K}$ is applied to the frequency domain IQ data for K users.

In the example, the RZF precoding at the BS MIMO Detector 109 is defined by the precoder matrix:

$$G = \frac{1}{\sqrt{\Psi}}(H^H H + \xi I_M)^{-1} H^H,$$

where $H \triangleq [h_1, \ldots, h_K] \in \mathbb{C}^{K \times M}$. The scalar ξ>0 here is the regularization parameter that tunes the precoder between conventional zero forcing (ZF) and matched filter (MT) schemes. Furthermore, the normalization parameter W in equation 1 can be chosen to satisfy the total power constraint $\{GG^H\} \leq M$ with equality; that is, for an RZF precoder $$\Psi \triangleq \frac{1}{M} tr\{Z^2 H^H H\},$$

with $Z \triangleq (H^H H + \xi I_M)$. In example, the BS channel estimator 108 can estimate the full channel state information (CSI) of the downlink channel by employing standard training methods known in the art.

In an embodiment, the beamforming weights can be calculated using zero-forcing (ZF)

$$G = \frac{1}{\sqrt{\Psi}}(H^H H)^{-1} H^H.$$

In another embodiment, a block floating point format can be used for transmission of the numbers such as the in-phase (I) and quadrature-phase (Q) data. For example, in yet another embodiment of the disclosure, described is a system and method to indicate numbers over the fronthaul interface with a sign exponent (to indicate numbers greater and less than 1) and sign mantissa (to indicate positive and negative numbers).

The numbers can be of variable bit-width format, which can either be pre-negotiated via a management plane message or can change dynamically. The numbers can have an exponent (with 1 sign bit to indicate numbers less than or greater than 1) and a mantissa (with 1 sign bit to indicate positive and negative numbers).

Table 2 shows a eCPRI C-Plane Section Type 6 table. The Section Type 6 table that can be used for transmission of the numbers for in-phase (I) and quadrature-phase (Q) data. The UE ID can used to match the channel state information (info) with the U-Plane data via the sectionID. As shown in Table 2, starting at Octet 15 down to the last antenna before the ueID at Octet N, repeated channel state information for a UE is given for each antenna and PRB

TABLE 3

| Section Type 6: Channel State Info conveyance | | | | | | | | | |
|---|---|---|---|---|---|---|---|---|---|
| 0 (msb) | 1 | 2 | 3 | 4 | 5 | 6 | 7 (lsb) | # of bytes | |
| ecpri Version | | | ecpriReserved | | | ecpriConcatenation | | 1 | Octet 1 |
| ecpriMessage | | | | | | | | 1 | Octet 2 |

TABLE 3-continued

Section Type 6: Channel State Info conveyance

| 0 (msb) | 1 | 2 | 3 | 4 | 5 | 6 | 7 (lsb) | # of bytes | |
|---|---|---|---|---|---|---|---|---|---|
| | | | ecpriPayload | | | | | 2 | Octet 3 |
| | | | ecpriRtcid | | | | | 2 | Octet 5 |
| | | | ecpriSeqid | | | | | 2 | Octet 7 |
| dataDirection | | payload Version | | | filterIndex | | | 1 | Octet 9 |
| | | | frameId | | | | | 1 | Octet 10 |
| | subframeId | | | | slotId | | | 1 | Octet 11 |
| slotId | | | startSymbolid | | | | | 1 | Octet 12 |
| | | | numberOfsections | | | | | 1 | Octet 13 |
| | | | sectionType = 6 | | | | | 1 | Octet 14 |
| | | | numberOfUEs | | | | | 1 | Octet 15 |
| | | | ueID | | | | | 2 | Octet 16 |
| | | | regularizationFactor | | | | | 2 | Octet 18 |
| reserved | | | rb | | | startPrbc | | 1 | Octet 20 |
| | | | startPrbc | | | | | 1 | Octet 21 |
| | | | numPrbc | | | | | 1 | Octet 22 |
| Isample (first Prbc, first antenna) Qsample (first Prbc, first antenna) . . . Isample (last Prbc, last antenna) Qsample (last Prbc, antenna) + padding as needed . . . | | | | | | | | | |
| | | | ueID | | | | | 2 | Octet N |
| | | | regularizationFactor | | | | | 2 | N + 2 |
| reserved | | | rb | | | startPrbc | | 1 | N + 4 |
| | | | startPrbc | | | | | 1 | N + 5 |
| | | | numPrbc | | | | | 1 | N + 6 |
| Isample (first Prbc, first antenna) Qsample (first Prbc, first antenna) . . . Isample (last Prbc, last antenna) Qsample (last Prbc, antenna) + padding as needed | | | | | | | | | |

In Table 2, the fields are as follows:
Message type=2 (C-plane msg).
Payload identifies the radio application payload length in bytes.
Rtcid identifies the carrier, antenna, and spatial stream (or layer).
Seqid identifies the sequence number of the C-plane msg.
DataDirection: 0=UL, 1=DL.
filterIndex points to channel filter in RU, usually 0x1.
frameId points to specific 10 ms frame.
SubframeId points to specific 1 ms subframe within a frame.
slotId points to specific slot within a frame.
numberOfsections number of sections in this message.
SectionType msg applies to 1=DL, 2=UL radio channels.
numberOfUEs number of UEs in this C-Plane message.
ueID UE ID associated with this set of Channel State Info.
regularizationTerm noise covariance of UE, 0=ZF BF.
rb 0=use every PRB, 1=use every other PRB.
StartPrbc first PRB this section applies to.
numPrbc number of PRBs this section applies to.
Isample channel information state value, in-phase sample, for $1^{st}$ PRB, $1^{st}$ antenna, then $2^{nd}$ antenna, and so on, then next PRB (bitwidth provided via M-Plane).
Isample channel information state value. quadrature sample, for $1^{st}$ PRB, $1^{st}$ antenna, then $2^{nd}$ antenna, and so on, then next PRB (bitwidth provided via M-Plane).

Third Generation Partnership Project (3GPP), ORRAN and xRan Working Group and CPRI technology standards and reports referred to herein and form a part of the present specification, and the entirety of each of which are attached hereto and incorporated by reference herein include:
3GPP TR 38.801 V14.0.0 (2017 March);
3GPPTS 213 ETSI TS 136 213 V13.0.0 (2016 May);
eCPRI specification V1.1 (2018 Jan. 10)
XRAN-FH.CUS.0-v02.01.03 (2018 Oct. 30)
ORAN-WG4.CUS.0-v01.00 (2019 Mar. 11)
ORAN-WG4.MP.0-v01.00 (2019 Mar. 11)
While the present disclosure has been described with reference to one or more exemplary embodiments, it will be understood by those skilled in the art that various changes may be made and equivalents can be substituted for elements thereof without departing from the scope of the present disclosure. In addition, many modifications can be made to adapt a particular situation or material to the teachings of the disclosure without departing from the scope thereof. Therefore, it is intended that the present disclosure not be limited to the particular embodiment(s) disclosed as the best mode contemplated.

The invention claimed is:

1. A cloud radio access network (CRAN) system, comprising:
    a baseband unit (BBU) having a centralized unit (CU) and a distributed unit (DU);
    a radio unit (RU) remote from the BBU, the RU comprising a radio frequency interface (RF) implemented in the RU and a plurality of antenna ports; and
    a fronthaul interface between the RU and the BBU;
    wherein a functional split of CRAN functions respectively assigned to CU and DU for the fronthaul interface between the BBU and the RU is dependent on a number of layers for all transmission modes (TM), and
    wherein the layer-dependent fronthaul interface between BBU and RU is configured with a common reference signal based transmission mode using a Common Public Radio Interface (eCPRI) section type separation message to distinguish the common reference signal based transmission mode from a user equipment (UE) specific reference signal based transmission mode, and wherein the RU interprets a beamforming index differently for the common reference signal based transmission mode than for the UE specific reference signal based transmission mode, the RU interpreting the beamforming index as a precoder index for the common reference signal based transmission mode.

2. A cloud radio access network (CRAN) system, comprising:
    a baseband unit (BBU) having a centralized unit (CU) and a distributed unit (DU);
    a radio unit (RU) remote from the BBU, the RU comprising a radio frequency interface (RF) implemented in the RU and a plurality of antenna ports; and
    a fronthaul interface between the RU and the BBU;
    wherein:
        a functional split of CRAN functions respectively assigned to CU and DU for the fronthaul interface between the BBU and the RU is dependent on a number of layers for all transmission modes (TM);
        the layer-dependent fronthaul interface between BBU and RU is configured with a common reference signal based transmission mode using a Common Public Radio Interface (eCPRI) section type separation message to distinguish the common reference signal based transmission mode from a user equipment (UE) specific reference signal based transmission mode; and
        the eCPRI message is configured to support layers for a plurality of UEs in a TM3 operation using separate section IDs in a separate section type for TM3 operation.

3. The CRAN system of claim 2, wherein no control information is required to be transmitted to indicate a beam ID, and a beam ID field can be filled with a default value and/or can be ignored.

* * * * *